May 21, 1929.   R. M. NEFF   1,714,101
SPRING SUSPENSION FOR VEHICLES
Filed Jan. 18, 1927
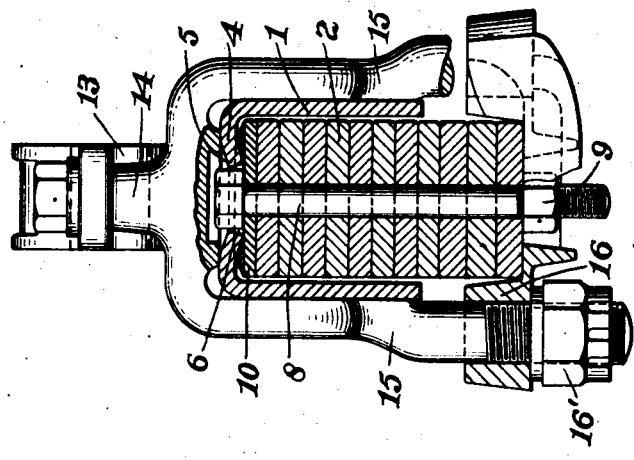
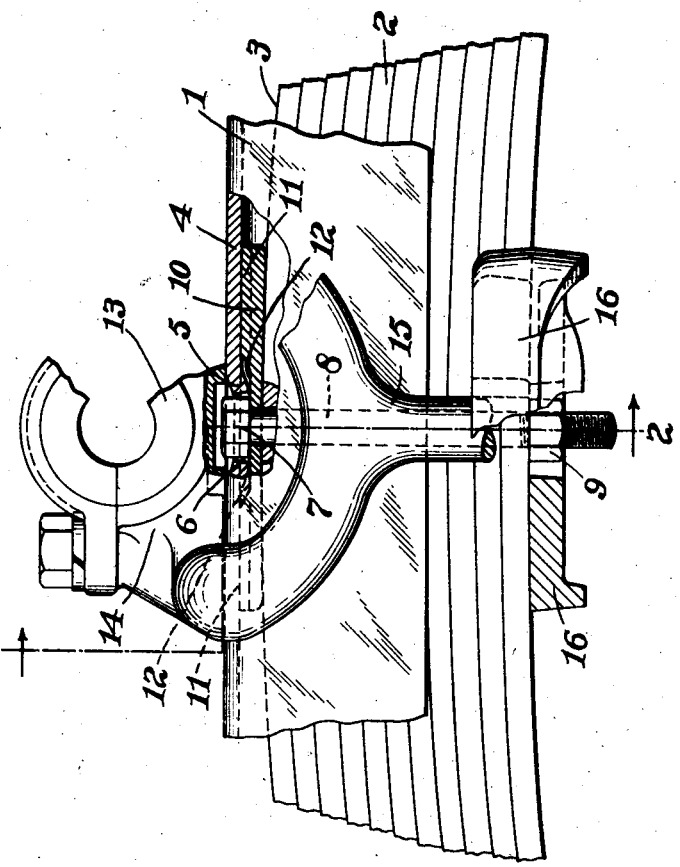
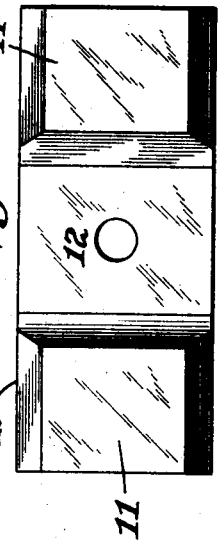
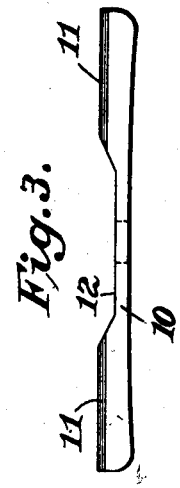
Inventor:
Russell M. Neff,
by Whittemore Hulbert Whittemore
and Belknap   Attys.

Patented May 21, 1929.

1,714,101

UNITED STATES PATENT OFFICE.

RUSSELL M. NEFF, OF DETROIT, MICHIGAN, ASSIGNOR TO DETROIT STEEL PRODUCTS COMPANY, OF DETROIT, MICHIGAN, A CORPORATION OF MICHIGAN.

SPRING SUSPENSION FOR VEHICLES.

Application filed January 18, 1927. Serial No. 161,888.

The invention relates to spring suspension for vehicles and refers more particularly to the front spring suspension of a standard make of motor vehicle having a front cross channel forming part of the frame and a front leaf spring extending within and secured to the front cross channel. With a spring suspension of this type as heretofore made there has been considerable breakage of the spring which is avoided by my invention. Other objects of the invention reside in the novel features of construction as more fully hereinafter set forth.

In the drawings:—

Figure 1 is a front elevation partly in section of a spring suspension for vehicles embodying my invention;

Figure 2 is a cross section on the line 2—2 of Figure 1;

Figures 3 and 4 are respectively front and bottom plan views of the pad forming part of the spring suspension.

The motor vehicle to which my invention is applied has the front downwardly opening cross channel 1, which is located at the front end of the motor vehicle frame. 2 is the leaf spring, the ends of which are secured to the front axle of the motor vehicle in the usual manner. This spring is bowed and extends upwardly within the cross channel and its upper face 3 normally diverges from the web 4 of the cross channel beyond their central portions. The central portion 5 of the web is depressed and formed with a polygonal aperture 6 for receiving the head 7 of the bolt 8 which extends through the leaves of the spring and is threadedly engaged at its lower end by the nut 9 for clamping the leaves together. 10 is a pad located between the web 4 of the cross channel and the upper face 3 of the spring at their centers. This pad has its upper face formed with the end portions 11 fitting the web 4 of the cross channel and with the intermediate recess 12 for receiving the centrally depressed web portion 5. The lower face of this pad is curved and preferably has the same radius of curvature as the upper face 3 of the spring to fit the latter and providing an extended contact therefor.

13 is the combined engine support and clip having the portion 14 located above the cross channel 1 in which the engine supporting bracket is journaled and the depending legs 15 at the front and rear sides of the cross channel 1 and spring 2 with their lower ends extending through the clip pad 16 and engaged by the nuts 16'. The upper portions of the arms are preferably bifurcated with the bifurcations integrally connecting into the opposite ends of the upper portion 14 of the combined support and clip. This combined support and clip is located at the center of the cross channel and spring and clamps the central portions of the spring and the web of the cross channel to the pad.

With the above arrangement breakage of the spring is avoided by reason of the extended contact with the central portion of its upper face. Furthermore, the central portion of the web of the cross channel is reinforced by the pad having end portions for fitting this web.

What I claim as my invention is:

1. The combination of a downwardly opening cross channel of a vehicle frame having its web formed with a central depressed portion, a leaf spring extending upwardly within said cross channel and having a curved upper face normally diverging from the web of said cross channel beyond their central planes, a pad between said cross channel and support having its upper face formed with end portions fitting the web of said channel and with a recess therebetween and spaced from the web aforesaid for receiving said centrally depressed web portion, said pad also having a lower face fitting and providing an extended contact with the upper face of said spring, and means for securing said spring, pad and web of the cross channel to each other.

2. The combination of a downwardly opening cross channel of a vehicle frame having its web formed with a centrally apertured depressed portion, a leaf spring extending upwardly within said cross channel and having a curved upper face normally diverging from the web of said cross channel beyond their central portions, a pad between said cross channel and spring having its upper face formed with end portions fitting the web of said channel and with a recess therebetween and spaced from the web of the channel for receiving said centrally apertured depressed web portion, said pad also having a lower face fitting and providing an extended contact with the upper face of said spring, a bolt extending through said spring and pad and having a head located in the aperture of said centrally depressed portion, and a combined engine support and clip for rigidly securing said spring, pad and web of the channel member to each other.

In testimony whereof I affix my signature.

RUSSELL M. NEFF.